Figure 3:
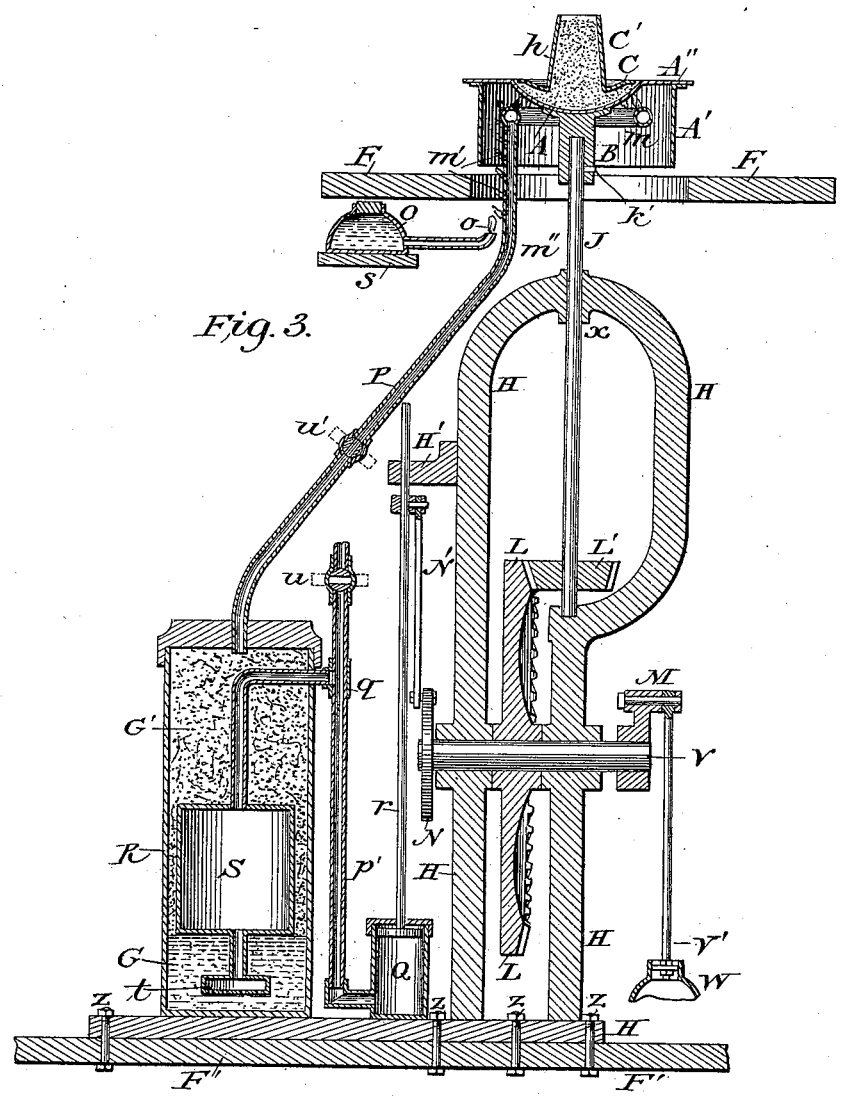

No. 618,428. Patented Jan. 31, 1899.
W. J. MORRISON & J. C. WHARTON.
CANDY MACHINE.
(Application filed Dec. 23, 1897.)
(No Model.) 2 Sheets—Sheet 1.
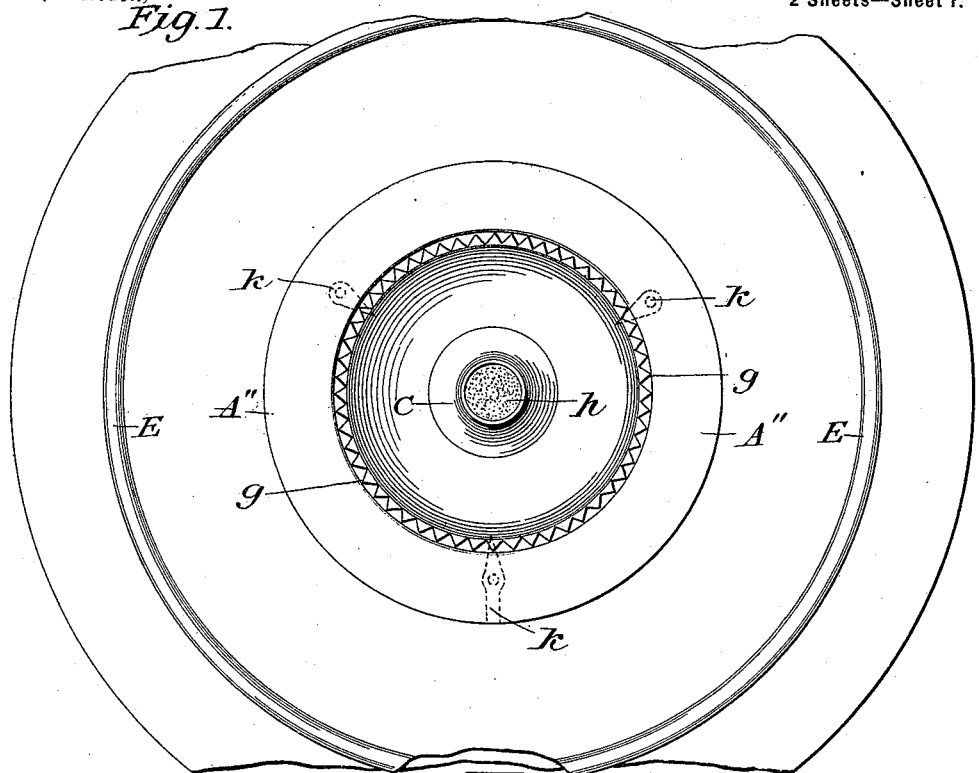
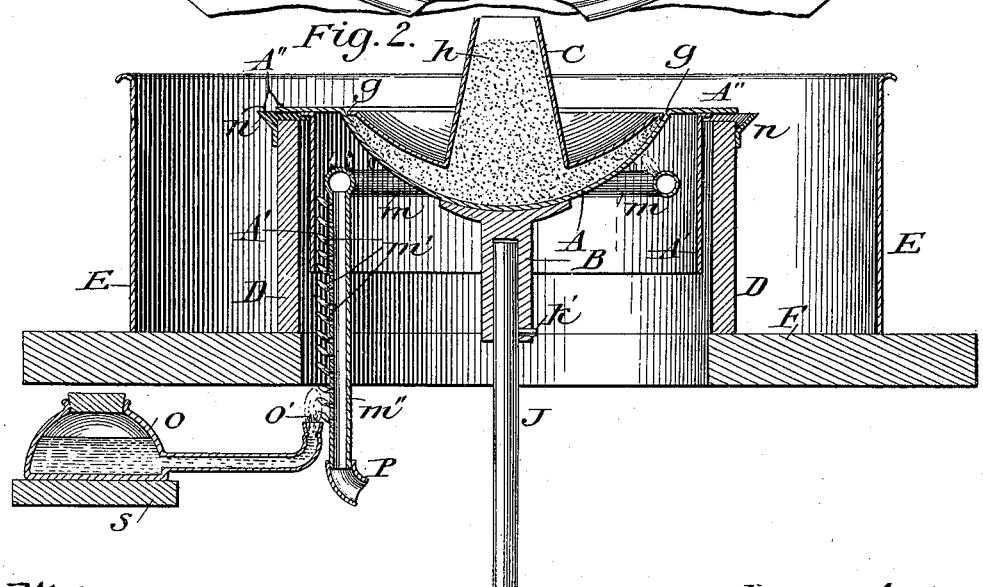
Witnesses.
Inventors.
William J. Morrison
John C. Wharton.

No. 618,428. Patented Jan. 31, 1899.
W. J. MORRISON & J. C. WHARTON.
CANDY MACHINE.
(Application filed Dec. 23, 1897.)

(No Model.) 2 Sheets—Sheet 2.

Witnesses. Inventors.

UNITED STATES PATENT OFFICE.

WILLIAM J. MORRISON AND JOHN C. WHARTON, OF NASHVILLE, TENNESSEE.

CANDY-MACHINE.

SPECIFICATION forming part of Letters Patent No. 618,428, dated January 31, 1899.

Application filed December 23, 1897. Serial No. 663,234. (No model.)

*To all whom it may concern:*

Be it known that we, WILLIAM J. MORRISON and JOHN C. WHARTON, citizens of the United States, residing at Nashville, in the county of Davidson and State of Tennessee, have invented certain new and useful Improvements in Candy-Machines, of which the following is a specification.

Our invention relates to improvements in candy-making, or, as commonly called, "candy-machines," in which a revoluble or rotating pan or vessel containing candy or melted sugar causes the said candy or melted sugar to form into masses of thread-like or silk-like filaments by the centrifugal force due to the rotation of the vessel.

The object of our invention is to obtain an edible product consisting of the said filaments of melted and "spun" sugar or candy. We attain the object or design of our invention by the mechanism illustrated in the accompanying drawings, in which—

Figure 1 is a plan view of the revoluble or rotative vessel and fender, the central portion of the vessel being shown partly in perspective shading. Fig. 2 is a vertical section of the revoluble vessel, top end of rotating shaft, lamp or burner, and other parts, described more in detail hereinafter. Fig. 3 is a vertical section of the main parts of the entire machine in one of its forms of construction, showing part of Fig. 2 on a reduced scale.

Similar letters refer to similar parts in all of the figures.

A represents a pan or vessel having a hub B, which is tubular and capable of being placed upon a revoluble shaft J, engaging with a pin $k'$ by means of a slot at the lower end of B. The pin $k'$ is made fast to the shaft J.

The pan A is provided with a rim A', which acts as a heat screen or deflector.

The pan A is essentially a bowl with a flange, as shown at A'', the upper surface consisting of a practically continuous area concave and plane.

The pan A is covered by an inverted funnel with curved or cup-shaped flange, as shown at C C'. In Fig. 1 the curved flange C is shown in perspective shading. In Fig. 2 the inverted funnel C' and curved flange C are shown in vertical section. The curved flange C is serrated on its outer edge, as shown at $g\,g$, Fig. 1, and thus makes a broken line of contact with A, the teeth of C touching A and forming a practically annular opening between A and C at the line of the imperfect junction $g\,g$.

The cover C C' is fastened detachably to A by means of lugs or pins (shown provisionally at $k\,k\,k$.) These lugs $k\,k\,k$ may be riveted to A and be made fast or loose, as the case may demand, so that the parts A and C may be coupled or uncoupled at will or as may be necessary for use or for cleaning out. The parts A and C when coupled together form a vessel having a chamber $h$, which may be filled with granulated sugar, or melted candy may be poured into the chamber.

The pan A has underneath it a burner $m$ for gas-jets or a lamp. The gas-jets are preferably arranged circularly. In the case represented by the drawings the burner $m$ is provided with a trailing jet-tube $m''$, which in operation supplies small jets of gas from the gasolene-tank R, and said gas is lighted by the flame O' of the lamp O; but other attachments for heating the vessel or pan A could be used, and the taper O' may be a gas-jet where it is convenient to make substitution.

The entire rotative or revoluble vessel A A' A'' C C', Fig. 2, is surrounded by a stationary cylinder D, which serves as a screen to the candy from the heat of the lamp or burner $m$ in addition to the screen A, which revolves, as before indicated. The cylinder D may be made multiple, so as to act most efficiently in obstructing the passage of heat from the burner $m$ to the candy after it has been formed. The cylinder D carries a flange $n$, Fig. 2, to prevent the filaments of candy from forming against the lower part of D. The cylinder D is supported by a shelf or table F, which has a suitable opening to allow the revoluble parts of the machine to operate.

The table F supports a fender E, which receives particles of melted sugar or candy against its inner side and also forms an inclosure for the silk-like filaments. Referring to Fig. 3, the revoluble vessel A A' A'' C C' is supported on a rotary shaft J, which is rotated around a vertical axis by means of beveled gear-wheels L L', propelled by foot-power in the manner of a lathe, the treadle shown provisionally at W acting through the connecting-rod V' and crank M to give rotary motion to the shaft V, &c.

The shaft V carries the beveled wheel L and a crank N. A connecting-rod N', attached to crank N, operates a pump Q through pump-rod r. The pump-rod r works in a bearing H' at its upper end. The air-pump Q forces air through a pipe P' and a T-joint at q, either into and through a tank R or through an open end outside of the tank R, by closing or opening a cock u above the T. The part of pipe P' which enters the tank R has an expanded chamber S to prevent the regurgitation of liquid into the pump Q and ends in a rose-head or perforated nozzle t, which causes the air to emerge from the pipe P' in small jets into the gasolene when the machine is operating.

The lower part of tank R is for the reception of gasolene G, and the upper part may be filled with any suitable porous materials G'—as coke, pumice-stone, &c.—to more thoroughly mix the vapor of gasolene and air in passing to the burner m through the pipe P. The flow is controlled by a stop-cock u', and the carbureted air escapes in jets at m' m' m when the pump is working, and the stop-cocks u u' are arranged to promote the flow in that direction.

The stop-cocks u u' may be operated simultaneously by a suitable connecting-rod. (Not shown in the drawings.)

A taper-lamp O, kept lighted, as occasion requires, supplies a flame O' to light the jets m' m', and also keeps the vessel A A' A'' C C' warm when the jets m' m' are not burning.

A suitable bed-plate H', underlying the machine, may be bolted to the floor F' of a room or of a movable box by bolts z z z, &c.

In operation the taper-lamp O is lighted and granulated sugar (or melted candy) is poured into the pan A through the inverted funnel C', and the cocks u u' are properly adjusted to allow the carbureted air to flow out at the burner and jets m'' m' m' m. The treadle is operated by the foot, and the pan A, &c., and contents are revolved through the connecting mechanism, as shown in the foregoing part of this specification. The gas or carbureted air is ignited by the taper, (or a match, if necessary,) and the sugar in the pan A is melted (or the candy, if used, is kept in a molten condition) and thrown by the centrifugal force of the revolving pan or vessel through the serrated part or perforations g g of the vessel, thence along the flanged part A'' to the extreme edge of the rotative vessel, then off from its edge into the surrounding chamber or space inclosed by the fender E, thus forming into silk-like filaments and small beads of candy.

By regulating the heat or properly controlling its action the molten sugar may be converted into several different forms or proportions of filaments, beads, or solid bands of candy.

We do not confine ourselves to the exact construction of the machine as shown in the drawings, as it is obvious that various forms might be given to the essential parts, that foot-power might be replaced by any other suitable power, and the mode of heating might be varied from coal-oil lamps to gasolene or gas burners of different kinds, &c., without altering the nature of the improvement.

Having thus described our invention, what we claim as new, and desire to secure by Letters Patent, is—

1. The combination, in a candy-machine, of a rotative, perforated vessel A, A', A'', C, C', and a heating attachment, or burner m, substantially as shown and for the purpose set forth.

2. The combination, in a candy-machine, of a rotative perforated vessel, a heating attachment, and a heat-screen D with flange n, and support F, substantially as shown and for the purpose set forth.

3. The combination, in a candy-machine, of a rotative, perforated vessel, a heating attachment and a heat-screen D, with flange n, support F and fender E, substantially as shown and for the purpose set forth.

WM. J. MORRISON.
JOHN C. WHARTON.

Witnesses:
I. E. NICHOL,
J. A. SHARPE.